United States Patent
Inoue

(10) Patent No.: US 11,256,450 B2
(45) Date of Patent: Feb. 22, 2022

(54) IMAGE READING DEVICE THAT READS DOCUMENT, AND IMAGE FORMING APPARATUS INCLUDING IMAGE READING DEVICE

(71) Applicant: KYOCERA Document Solutions Inc., Osaka (JP)

(72) Inventor: Yasufumi Inoue, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/230,820

(22) Filed: Apr. 14, 2021

(65) Prior Publication Data
US 2021/0326080 A1 Oct. 21, 2021

(30) Foreign Application Priority Data
Apr. 20, 2020 (JP) .............................. JP2020-074775

(51) Int. Cl.
*G06F 3/12* (2006.01)
*H04N 1/00* (2006.01)

(52) U.S. Cl.
CPC .......... *G06F 3/1204* (2013.01); *G06F 3/1256* (2013.01); *H04N 1/0044* (2013.01)

(58) Field of Classification Search
CPC .................................................. H04N 1/0044
See application file for complete search history.

(56) References Cited

U.S. PATENT DOCUMENTS

| 2014/0241737 A1* | 8/2014 | Shirasaka | .......... G03G 15/6552 399/20 |
| 2015/0160895 A1 | 6/2015 | Mizuno | |
| 2015/0326743 A1* | 11/2015 | Yabuuchi | .......... H04N 1/00737 358/498 |

FOREIGN PATENT DOCUMENTS

JP 2015-091119 A 5/2015

* cited by examiner

*Primary Examiner* — King Y Poon
*Assistant Examiner* — Michael Burleson
(74) *Attorney, Agent, or Firm* — IP Business Solutions, LLC

(57) ABSTRACT

An image forming apparatus includes an operation panel, a document transport device, an image reader, and a control device. The document transport device transports a source document while a moving document reading job is being performed. The image reader reads the source document being transported by the document transport device. The control device suspends the moving document reading job, when jam occurs during the moving document reading job, and displays, on the operation panel, a preview image of the non-blank page that has been read last in the period from the start of the moving document reading job to the suspension thereof, when the page last read in the period from the start of the moving document reading job to the suspension thereof is the blank page, and the number of blank pages read is two or more.

7 Claims, 8 Drawing Sheets

IMAGE READING DEVICE THAT READS DOCUMENT, AND IMAGE FORMING APPARATUS INCLUDING IMAGE READING DEVICE

INCORPORATION BY REFERENCE

This application claims priority to Japanese Patent Application No. 2020-074775 filed on Apr. 20, 2020, the entire contents of which are incorporated by reference herein.

BACKGROUND

The present disclosure relates to an image reading device that reads a source document, and to an image forming apparatus.

The image reading device includes an image reader that reads a source document. A user may wish to check the reading result provided by the image reader, in advance. Accordingly, the image reading device having a preview function has been developed. To be more detailed, some image reading devices include an image display device, on which a preview screen, including the preview image of the page that has been read, is displayed. Such image reading devices are configured to perform an editing operation, for example deleting image data (read data) of an unnecessary page, on the preview screen.

SUMMARY

The disclosure proposes further improvement of the foregoing technique.

In an aspect, the disclosure provides an image reading device including an operation panel, a document transport device, an image reader, and a control device. The document transport device transports a source document while a moving document reading job is being performed. The image reader reads the source document being transported by the document transport device. The control device includes a processor, and decides, when the processor executes a control program, whether a page of the source document read by the image reader is a blank page without an image, or a non-blank page including an image, with respect to each of the pages read. The control device also suspends the moving document reading job, when jam occurs during the moving document reading job, decides whether a page last read in a period from start of the moving document reading job to the suspension thereof is the blank page, identifies a number of blank pages read during the period from the start of the moving document reading job to the suspension thereof, and displays, on the operation panel, a preview image of the non-blank page that has been read last in the period from the start of the moving document reading job to the suspension thereof, when the page last read is the blank page, and the number of blank pages read is two or more.

In another aspect, the disclosure provides an image forming apparatus including the foregoing image reading device and an image forming device. The image forming device forms an image on a recording medium.

DETAILED DESCRIPTION

Hereafter, an image reading device and an image forming apparatus according to an exemplary embodiment of the disclosure will be described, with reference to the drawings. For the description of the embodiment of the image reading device according to the present disclosure, an image forming apparatus (multifunction peripheral), configured to perform various jobs such as a copying job and a transmission job, will be taken up as an example.

Configuration of Image Forming Apparatus

Figure 1:
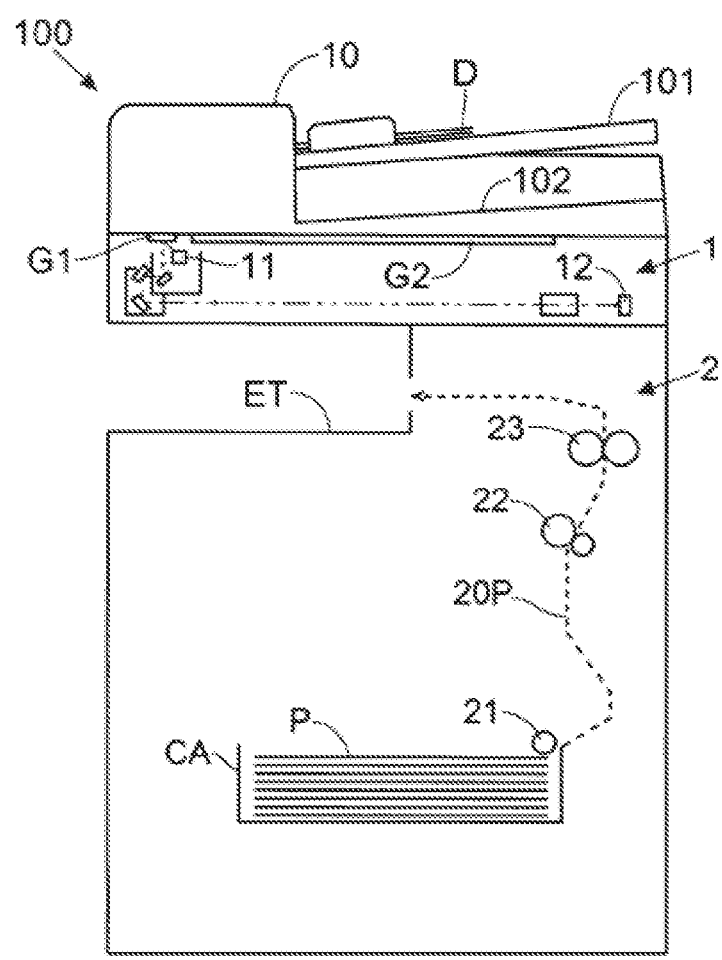
FIG. 1 is a schematic front view showing an image forming apparatus according to an embodiment of the disclosure.

As shown in FIG. 1, the image forming apparatus 100 according to this embodiment includes an image reader 1 and a printing device 2. The image reader 1 reads a document D. The printing device 2 prints an image on a sheet P.

The image reader 1 includes a light source 11 and an image sensor 12. The light source 11 emits light to the document D. The image sensor 12 receives the light reflected by the document D, and performs photoelectric conversion of the reflected light. The light source 11 and the image sensor 12 are located inside the casing of the image reader 1.

Contact glasses G1 and G2 are provided on the upper face of the casing of the image reader 1. The image reader 1 is configured to perform two reading modes, namely a moving document reading mode and a fixed document reading mode. The contact glass G1 is used for the moving document reading mode. A reading position RP is set at a predetermined position on the contact glass G1 (see FIG. 2), for the image reader 1 to read the document D in the moving document reading mode. The contact glass G2 is used for the fixed document reading mode.

Figure 2:
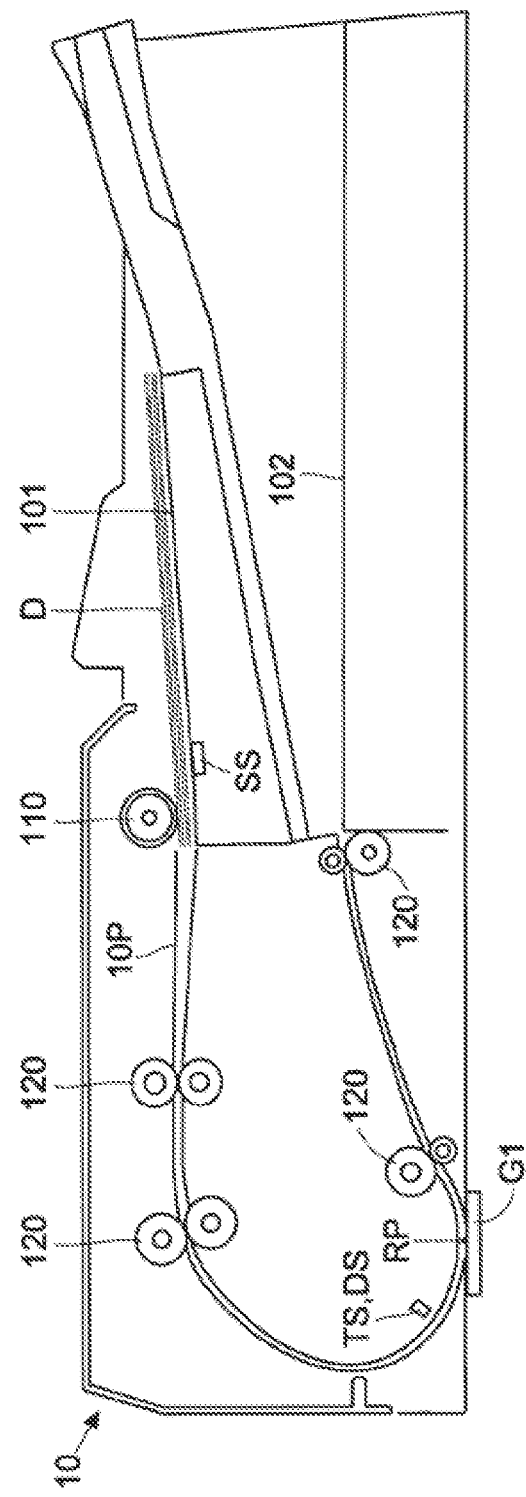
FIG. 2 is a schematic cross-sectional view of a document transport device of the image forming apparatus according to the embodiment of the disclosure.

A document transport device 10 is pivotably mounted on the casing of the image reader 1. The document transport device 10 includes a document setting tray 101 and a document discharge tray 102. The document transport device 10 transports the documents D set on the document setting tray 101, one by one toward the reading position RP (predetermined position on the contact glass G1). The document transport device 10 also discharges the document D that has passed the reading position RP (document D that has been read), to the document discharge tray 102. FIG. 2 schematically illustrates the structure of the document transport device 10.

A document transport route 10P is provided for the document transport device 10. The document transport route 10P extends from the document setting tray 101 as far as the document discharge tray 102, through the reading position RP. The document transport device 10 transports the document D, along the document transport route 10P. The document D being transported passes the reading position RP.

The document transport device 10 includes a document feed roller 110. The document feed roller 110 makes contact with the document D set on the document setting tray 101, and rotates in contact with the document D. Accordingly, the document D is delivered from the document setting tray 101 to the document transport route 10P. Though not shown, a separation mechanism, configured to separate the documents D drawn out from the document setting tray 101 by the document feed roller 110 into a single sheet, is provided downstream of the document feed roller 110, in the document transport direction. With the separation mechanism, the documents D can be prevented from being delivered to the document transport route 10P, in a stacked state. In other words, duplicate feeding of the documents D can be prevented.

The document transport device 10 also includes a plurality of document transport roller pairs 120. The document transport roller pair 120 is provided at a plurality of positions on the document transport route 10P. The document transport roller pairs 120 each include a drive roller and a follower roller. The drive roller and the follower roller are pressed against each other, so that a transport nip is defined. The document transport roller pairs 120 each forward the document D that has entered the transport nip, by rotating.

In the moving document reading mode, the documents D are set on the document setting tray 101. The document transport device 10 transports the documents D set on the document setting tray 101 one by one along the document transport route 10P, and discharges the documents D to the document discharge tray 102. The image reader 1 reads the document D passing the reading position RP.

In the fixed document reading mode, the document D is placed on the non-illustrated contact glass G2. The image reader 1 reads the document D placed on the contact glass G2.

Referring again to FIG. 1, the printing device 2 includes a paper feed roller 21. The paper feed roller 21 rotates in contact with the sheet P stored in the paper cassette CA. Accordingly, the sheet P is delivered from the paper cassette CA to a sheet transport route 20P, indicated by a broken-line arrow in FIG. 1.

The printing device 2 includes a transfer roller pair 22. The transfer roller pair 22 includes a photoconductor drum and a transfer roller. The photoconductor drum carries a toner image, on the circumferential surface thereof. The transfer roller is pressed against the photoconductor drum, and defines a transfer nip in collaboration with the photoconductor drum. The transfer roller pair 22 transfers, by rotating, the toner image onto the sheet P, while transporting the sheet P that has entered the transport nip.

Though not shown, the printing device 2 also includes a charging device, an exposure device, and a developing device. The charging device electrically charges the circumferential surface of the photoconductor drum. The exposure device forms an electrostatic latent image on the circumferential surface of the photoconductor drum. The developing device develops the electrostatic latent image on the circumferential surface of the photoconductor drum, into a toner image.

Further, the printing device 2 includes a fixing roller pair 23. The fixing roller pair 23 includes a heat roller and a pressure roller. The heat roller includes a non-illustrated heater, installed thereinside. The pressure roller is pressed against the heat roller, and defines a fixing nip in collaboration with the heat roller. The fixing roller pair 23 fixes onto the sheet P the toner image transferred thereto, by rotating, while transporting the sheet P that has entered the fixing nip. The sheet P that has passed the fixing nip is discharged to an output tray ET.

In the copying job, the image reader 1 reads the document D. Then the printing device 2 prints the image, based on the image data acquired through the reading of the document D, on the sheet P.

Figure 3:
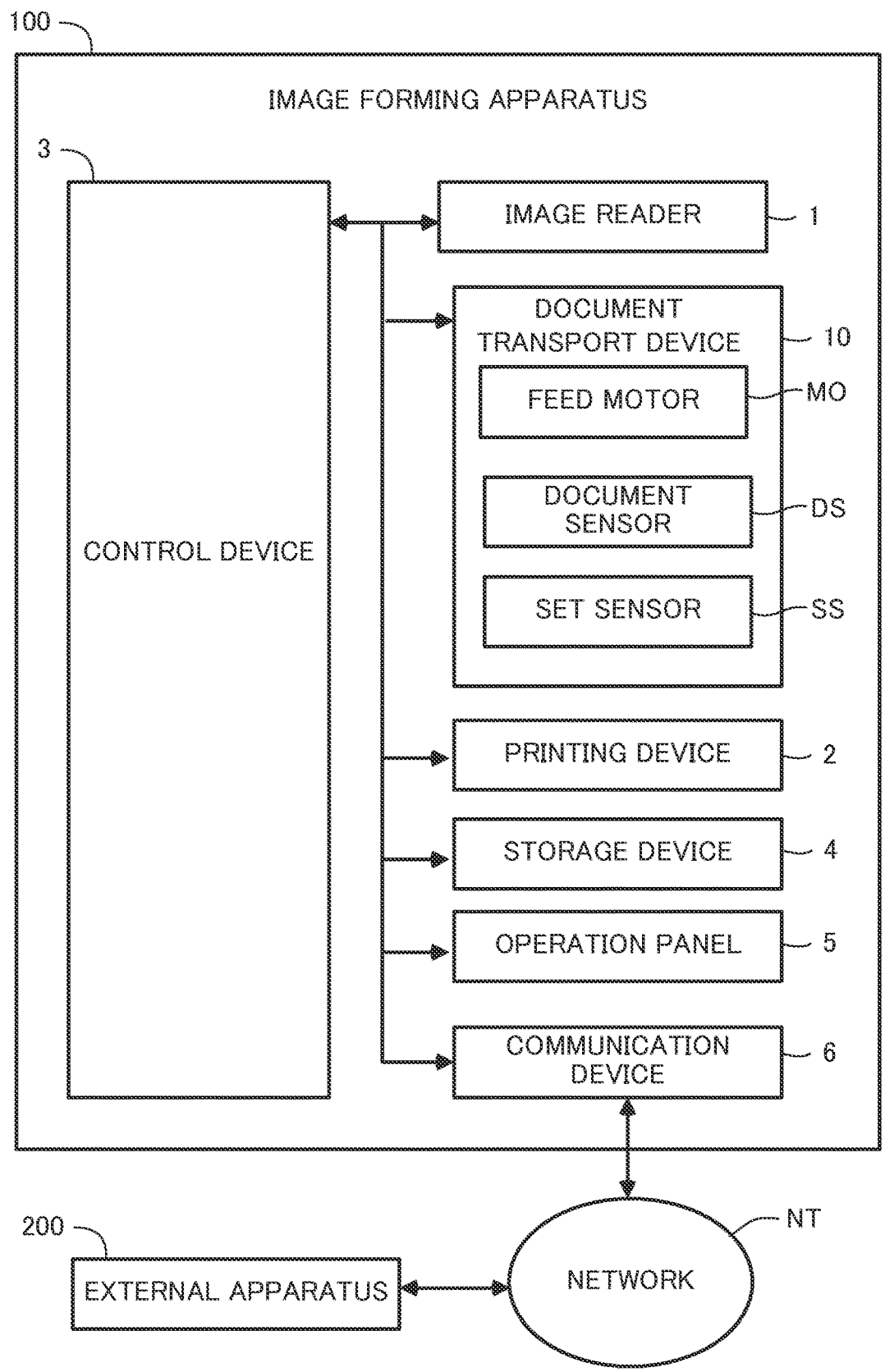
FIG. 3 is a block diagram showing a configuration of the image forming apparatus according to the embodiment of the disclosure.

The image forming apparatus 100 includes, as shown in FIG. 3, a control device 3 and a storage device 4. The control device 3 includes a processor, a random-access memory (RAM), and a read-only memory (ROM). The processor may be, for example, a central processing unit (CPU), a micro processing unit (MPU), or an application specific integrated circuit (ASIC). When the processor executes a control program and control data, the control device 3 controls the operation of the image forming apparatus 100, and also performs operations including, for example, deciding whether each of the pages of the source document read by the image reader 1 is a blank page without an image, or a non-blank page having an image.

The control device 3 also controls the copying job, and the transmission job. The control device 3 performs image processing, to the image data utilized in each of the jobs. The storage device 4 includes storage units such as a ROM, a RAM, and a HDD. The storage device 4 is connected to the control device 3. The control program and the control data are, for example, stored in the storage device 4.

The control device 3 controls the image reader 1. The control device 3 controls a feed motor MO that drives the rollers provided in the document transport device 10, such as the document feed roller 110 and the document transport roller pair 120. Further, the control device 3 controls the printing device 2.

The image forming apparatus 100 includes an operation panel 5. The operation panel 5 includes a touch screen. The touch screen displays a screen on which software buttons are arranged, and receives a touch operation performed by the user on the displayed screen. The operation panel 5 includes a plurality of hardware buttons. The plurality of hardware buttons include, for example, a start button for receiving the user's instruction to execute a job.

The operation panel 5 is connected to the control device 3. The control device 3 controls the displaying operation of the operation panel 5. The control device 3 also detects an operation performed on the operation panel 5. When the operation panel 5 receives an instruction to execute a job, the control device 3 executes the job. When the instructed job is the copying job, the control device 3 causes the image reader 1 to read the document D. Then the control device 3 causes the printing device 2 to print the image based on the image data acquired through the reading of the document D, on the sheet P.

The image forming apparatus 100 includes a communication device 6. The communication device 6 includes a communication circuit and a communication memory. The communication circuit controls the communication. The communication memory contains communication software. The communication device 6 is communicably connected to an external apparatus 200, via a network NT. The external apparatus 200 is, for example, a personal computer (user terminal device), a server, and a FAX machine.

The communication device 6 is connected to the control device 3. The control device 3 utilizes the communication device 6 to transmit and receive data, to and from the external apparatus 200. In the transmission job, the image forming apparatus 100 transmits the image data acquired through the reading of the document D, to the external apparatus 200.

Jam Detection

A document sensor DS is connected to the control device 3 (see FIG. 3). The document sensor DS detects the document D at a predetermined detection position on the document transport route 10P. The document sensor DS varies the output value, according to the transport status of the document D along the document transport route 10P.

The document sensor DS is a transmissive optical sensor, having a light emitting element and a photodetector. The document sensor DS utilizes a non-illustrated actuator, for the detection. When the leading edge of the document D reaches the detection position of the document sensor DS, the actuator rotates in a direction upon being pressed by the document D, so as to block (or open up) the optical path between the light emitting element and the photodetector of the document sensor DS. When the trailing edge of the document D passes the detection position of the document sensor DS, the actuator rotates in the opposite direction, so as to open up (or block) the optical path of the document sensor DS.

When the document D is present at the predetermined detection position, the document sensor DS outputs a signal of a first level (one of H-level and L-level). When the document D is not located at the detection position, the document sensor DS outputs a signal of a second level (the other of H-level and L-level). To be more detailed, when the leading edge of the document D reaches the detection position, the document sensor DS shifts the level of the output value, from the second level to the first level. When the trailing edge of the document D passes the detection position, the document sensor DS shifts the level of the output value, from the first level to the second level.

A plurality of the document sensors DS are provided. In other words, a plurality of detection positions are set for the respective document sensors DS, on the document transport route 10P. The number of the document sensors DS and the locations thereof are not specifically limited, and may be modified as desired.

During the reading operation in the moving document reading mode, the control device 3 monitors the output values of the respective document sensors DS, to thereby detect the transport status of the document D on the document transport route 10P. In other words, the control device 3 detects whether the document D is present at the detection positions of the respective document sensors DS, on the basis of the output values of the document sensors DS. The control device 3 also detects the arrival of the leading edge of the document D, and the passing of the trailing edge thereof, at and from the detection position of each of the document sensors DS, on the basis of the output value of the corresponding document sensor DS.

The control device 3 detects whether jam has occurred on the document transport route 10P, on the basis of the output values of the respective document sensors DS. When jam occurs on the document transport route 10P, the control device 3 causes the document transport device 10 to suspend the transport of the document D. Then the user removes the document D detained on the document transport route 10P (jam fixing operation).

To decide whether jam has occurred on the document transport route 10P, the control device 3 starts to measure the time, after the arrival of the leading edge of the document D is detected at the detection position of a given document sensor DS (hereinafter, first sensor). Then the control device 3 decides that jam has occurred, in the case where the arrival of the leading edge of the document D is not detected at the detection position of another document sensor DS (hereinafter, second sensor) located downstream of the first sensor in the transport direction, before a predetermined jam detection time elapses after the arrival of the leading edge of the document D is detected at the detection position of the first sensor. The jam detection time for the mentioned case refers to the total of a theoretical document transport time from the detection position of the first sensor to the detection position of the second sensor, and a predetermined margin.

In addition, the control device 3 decides that jam has occurred, in the case where the passing of the trailing edge of the document D is not detected at the detection position of a given document sensor DS, after a predetermined jam detection time has elapsed from the time that the arrival of the leading edge of the document D was detected, at the detection position of the same document sensor DS. The jam detection time for the mentioned case refers to the total of a theoretical document transport time from the arrival of the leading edge of the document D at the detection position of the document sensor DS, to the passing of the trailing edge of the document D from the same detection position, and a predetermined margin.

Exclusion of Blank Page

The image forming apparatus 100 is equipped with a blank page exclusion function. The validity or invalidity of the blank page exclusion function can be optionally selected by the user. The setting of the validity or invalidity of the blank page exclusion function is inputted by the user through the operation panel 5.

It will be assumed that, for example, a plurality of pages of documents D, including one or more blank pages and one or more non-blank pages, are set on the image forming apparatus 100 as documents to be read. The non-blank page refers to a page with an image (character, figure, photo, and so forth). The blank page refers to a page without any image.

When the plurality of pages of documents D, including the blank pages and the non-blank pages, are set on the image forming apparatus 100 as documents to be read, and the reading is performed in the moving document reading mode, the image data representing the blank page, and the image data representing the non-blank page are generated.

In the case where the setting of the blank page exclusion function is invalid, the image data representing the blank page, and the image data representing the non-blank page are both outputted. When the job to be executed is the copying job, blank sheets P are outputted, in addition to the sheets P on which the image has been printed. When the job to be executed is the transmission job, the image data representing the blank page, and the image data representing the non-blank page are packed in a single file, and transmitted to the external apparatus 200.

When the user does not wish to exclude the blank page, the user sets the blank page exclusion function invalid. For example, when the user wishes to intentionally insert the blank page, the user can set the blank page exclusion function invalid. In this case, the blank page is not excluded.

On the other hand, the user may wish to exclude the blank page. It is possible to exclude the blank page, by checking each of the plurality of pages of the documents D and excluding the blank page in advance. However, such a job is troublesome to the user.

For such reason, the image forming apparatus 100 is equipped with the blank page exclusion function. When the blank page exclusion function is set valid, the image data representing the blank page is automatically excluded. In other words, the image data representing the blank page is not outputted, but only the image data representing the non-blank page is outputted.

As part of the operation with the blank page exclusion function, the control device 3 performs blank page detection, including detecting whether each of the pages of the document D, read by the image reader 1, is a blank page. Then the control device 3 deletes the image data representing the blank page.

The method of the blank page detection is not specifically limited. The control device 3 acquires the image data read from the document D, with respect to each of the pages. Then the control device 3 decides whether the image data represents the blank page, with respect to each of the pages. For example, the control device 3 may count the number of black pixels (pixels gray level of which corresponds to black) contained in the image data, and decide that a page corresponding to the image data, in which the counted number is equal to or lower than a threshold, is a blank page.

Reading in Transported Document Reading Mode

Upon detecting that the start button on the operation panel 5 has been touched, with the document D set on the document setting tray 101, the control device 3 decides that an instruction to execute a job, including reading in the moving document reading mode, has been received. Hereinafter, the job including the reading in the moving document reading mode will be referred to as moving document reading job.

Upon receipt of the instruction to execute the moving document reading job, the control device 3 causes the document transport device 10 to transport the document D. The document transport device 10 delivers the document D on the document setting tray 101 to the document transport route 10P, and transports the document D along the document transport route 10P. The document D passes the reading position RP, while being transported.

When the first sheet of the document D has been delivered, the control device 3 decides whether one or more documents D remain on the document setting tray 101, in other words whether there is a document D to be delivered next, on the basis of an output value of a set sensor SS (see FIG. 2 and FIG. 3). The set sensor SS is provided in the document setting tray 101. The set sensor SS varies the output value, depending on whether a document D is set on the document setting tray 101. In the case where a document D remains on the document setting tray 101, the control device 3 causes the document transport device 10 to deliver and transport the second document D, such that a predetermined distance is secured between the trailing edge of the first document D and the leading edge of the second document D. Thereafter, in the case where a document D remains on the document setting tray 101, the control device 3 causes the document transport device 10 to deliver and transport the next document D, such that the predetermined distance is secured between the preceding document D and the next document D.

Under the instruction to execute the moving document reading job, the control device 3 causes the image reader 1 to read the document D being transported. In this process, the control device 3 adjusts the timing to start to read the document D, on the basis of an output value of a timing sensor TS (see FIG. 2), which is another document sensor DS, the detection position of which is set at a predetermined position upstream of the reading position RP, in the document transport direction.

The control device 3 causes the image reader 1 to start to read one sheet of the document D, when a scheduled arrival time, corresponding to the time after the leading edge of the document D reached the detection position of the timing sensor TS, until the leading edge of the document D reaches the reading position RP, has elapsed. Then the control device 3 causes the image reader 1 to finish the reading of the one sheet of the document D, when a scheduled passing time, corresponding to the time after the leading edge of the document D reached the detection position of the timing sensor TS, until the trailing edge of the document D passes the reading position RP, has elapsed. The scheduled arrival time is determined on the basis of the document transport distance and the document transport speed, between the detection position of the timing sensor TS and the reading position RP. The scheduled passing time is determined on the basis of the document transport distance and the document transport speed, between the detection position of the timing sensor TS and the reading position RP, and the size (length in the document transport direction) of the document D.

Each time one page of the document D has been read, the control device 3 stores the image data corresponding to the one page, in the storage device 4. When a plurality of pages of documents D are set on the document setting tray 101, the document transport device 10 delivers and transports the plurality of pages of the documents D, one by one. The image reader 1 reads the documents D transported to the reading position RP, one by one. Therefore, the image data representing each of the plurality of pages is stored in the storage device 4.

Rereading of Document

In case jam occurs on the document transport route 10P during the execution of the moving document reading job, the control device 3 causes the document transport device 10 to suspend the transport of the document D. In other words, the control device 3 suspends the moving document reading job.

Upon suspending the moving document reading job, the control device 3 urges the user, through the operation panel 5, to perform a rereading operation, which is an operation for resuming the moving document reading job. To be more detailed, the operation panel 5 displays a message M1 (see FIG. 4) urging the user to reset the document D not yet read by the image reader 1 (unread document D), on the document setting tray 101. The operation panel 5 also displays a message M2 (see FIG. 4) urging the user to press the start button, after resetting the document D.

Upon detecting that the start button on the operation panel 5 has been pressed, after the moving document reading job was suspended, the control device 3 detects whether a document D is set on the document setting tray 101, on the basis of the output value of the set sensor SS. In the case where the document D is not set on the document setting tray 101, the control device 3 displays, on the operation panel 5, a non-illustrated warning message, notifying the user that the document D is not set on the document setting tray 101. In view of the warning message, the user is led to set the document D on the document setting tray 101.

When the document D is set on the document setting tray 101, the control device 3 resumes the moving document reading job. The document transport device 10 delivers and transports the document D from the document setting tray 101. The image reader 1 reads the document D passing the reading position RP. The control device 3 stores the image data representing each of the pages acquired through the moving document reading job (rereading), in the storage device 4.

Error Screen Display

Figure 4:
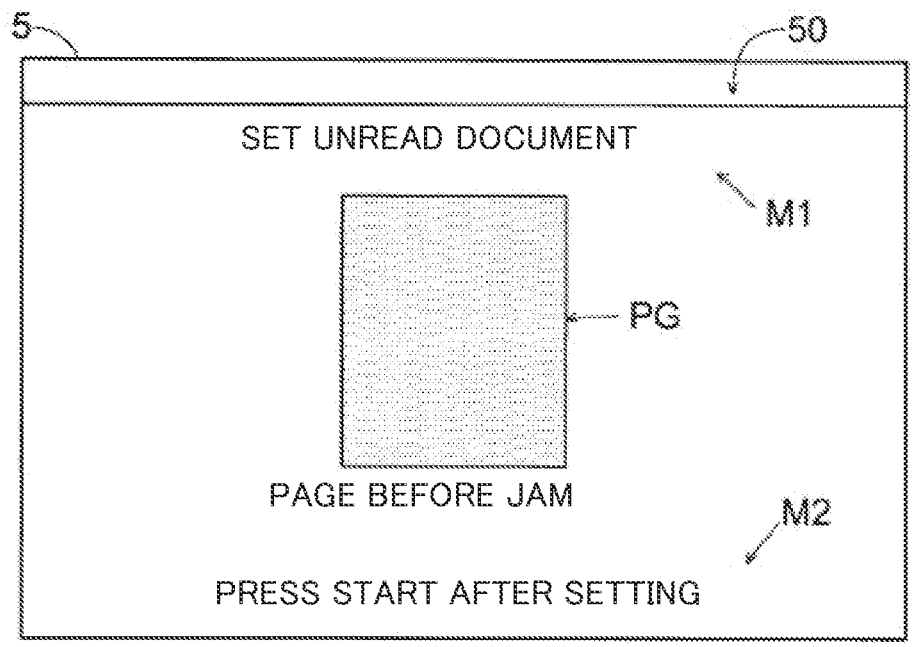
FIG. 4 is a schematic drawing showing an error screen displayed on an operation panel of the image forming apparatus according to the embodiment of the disclosure.

When the moving document reading job is suspended (when jam has occurred on the document transport route 10P), the control device 3 displays an error screen 50 shown in FIG. 4, on the operation panel 5. The error screen 50 includes the messages M1 and M2. The error screen 50 shown in FIG. 4 is only exemplary, and the screen layout may be modified as desired.

When the moving document reading job is suspended, the control device 3 also generates a preview image PG representing the page that was read immediately before the occurrence of the jam, and displays the preview image PG on the operation panel 5. The operation panel 5 displays the error screen 50 including the preview image PG.

Figure 5:
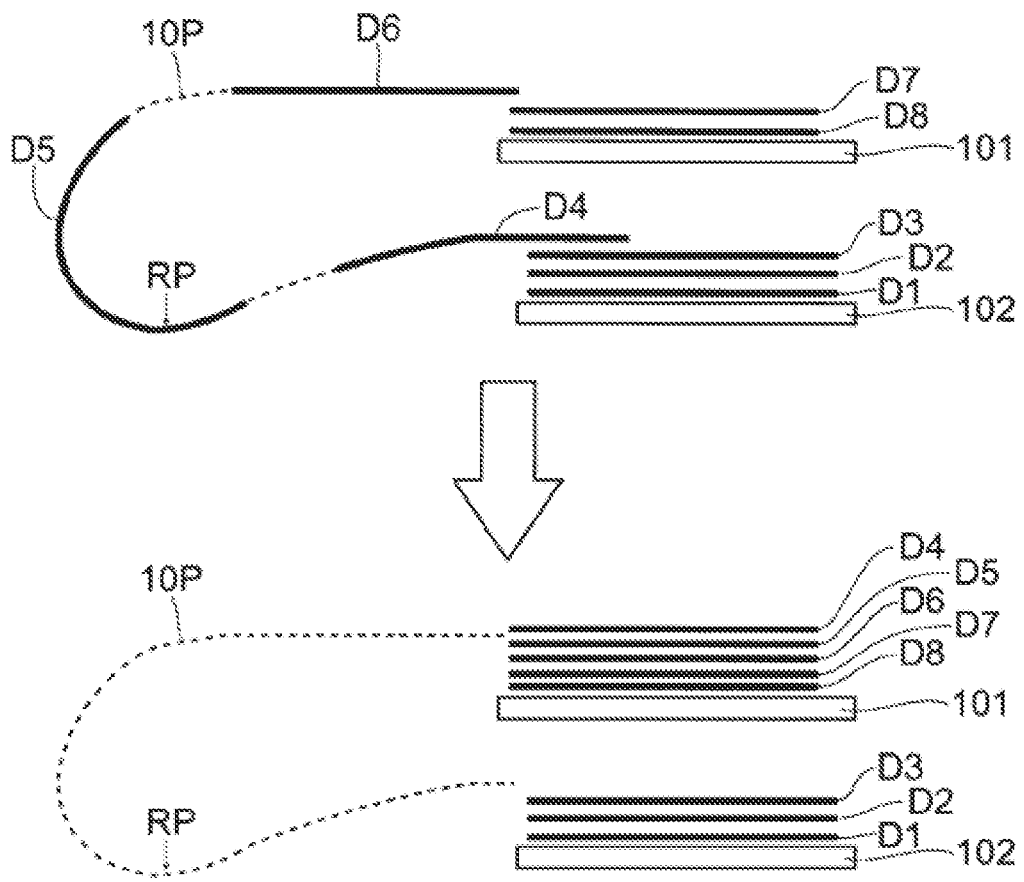
FIG. 5 is a schematic drawing showing a state where paper jam has occurred, in the document transport device of the image forming apparatus according to the embodiment of the disclosure.

It will be assumed that, for example, jam has occurred in the state illustrated in the upper section of FIG. 5. In FIG. 5, the document transport device 10 is simplified for the sake of convenience. The document transport route 10P is indicated by broken lines.

In the example illustrated in the upper section of FIG. 5, eight sheets of documents D (eight pages of documents D) are involved. Out of the eight sheets of the documents D, three sheets with the reference code D1, D2, and D3 are completely discharged to the document discharge tray 102. The document D with the code D4 still remains on the document transport route 10P, but the trailing edge of the document D4 has already passed the reading position RP. Therefore, the reading of the documents D1 to D4 has been completed.

On the other hand, out of the eight sheets of the documents D, the documents D5 and D6, are on the document transport route 10P, and the trailing edge of neither of these documents has not passed the reading position RP yet. The documents D7 and D8 remain on the document setting tray 101, without being drawn out therefrom. Accordingly, in the example illustrated in the upper section of FIG. 5, the documents D5 to D8 correspond to the unread document D.

In case jam occurs in the state illustrated in the upper section of FIG. 5, the user performs the jam fixing operation, to reset the unread document D on the document setting tray 101. More specifically, the user removes the documents D4 to D6 from the document transport route 10P. Here, although the reading of the document D4 is already completed, the document D4 is not completely discharged. In such a case, it is difficult for the user to accurately decide whether the document D4 has been completely read. Therefore, the document D4 may be reset on the document setting tray 101 in addition to the documents D5 to D8, despite rereading of the document D4 being unnecessary. The lower section of FIG. 5 illustrates the state where the documents D4 to D8 are reset on the document setting tray 101.

Accordingly, the control device 3 generates the preview image PG representing the page read before the occurrence of the jam, and displays the preview image PG on the operation panel 5. The operation panel 5 displays the error screen 50 including the preview image PG. The error screen 50 also includes, for example, a message to the effect that the preview image PG is representing the page that has been read before the occurrence of the jam.

Selection of Preview Image

It will be assumed that jam has occurred in the state illustrated in the upper section of FIG. 5.

Figure 6:
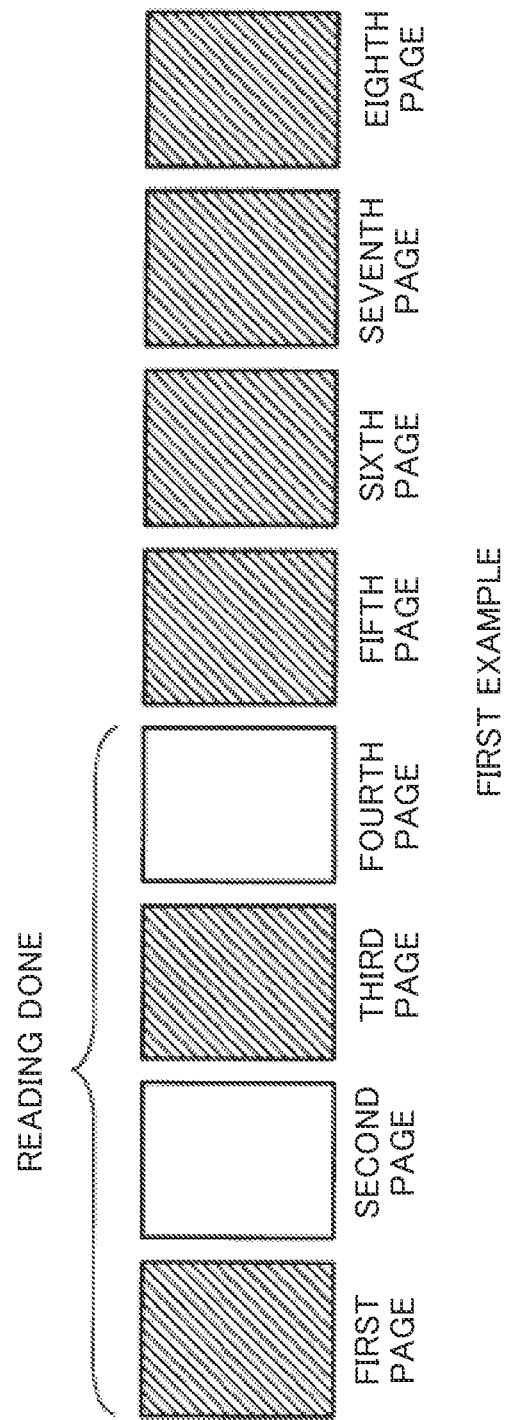
FIG. 6 is a schematic drawing showing a first example of pages to be read.

It is also assumed, as a first example, that the respective read faces of the documents D1, D3, and D5 to D8 (face oriented downward when passing the reading position RP) are non-blank faces each having an image, and the respective read faces of the documents document D2 and D4 are blank faces without any image. In other words, as shown in FIG. 6, the first and third pages, and the fifth to eighth pages are the non-blank pages, and the second and fourth pages are the blank pages. In FIG. 6, the non-blank pages are hatched, and the blank pages are illustrated in blank rectangles. This also applies to FIG. 7.

In the case of the first example, the preview image PG of the fourth page (corresponding to the image data of the document D4) is displayed. In other words, the preview image PG representing the blank page is displayed.

In the first example, the document D2, the read face of which is the blank face, has been discharged to the document discharge tray 102. Accordingly, when the preview image PG of the blank page is displayed in the first example, the user may be led to decide that only the documents D1 and D2 have been completely read, despite the documents D1 to D4 all having been completely read. In such a case, the documents D3 to D8 may be reset on the document setting tray 101 (erroneous setting).

Figure 7:
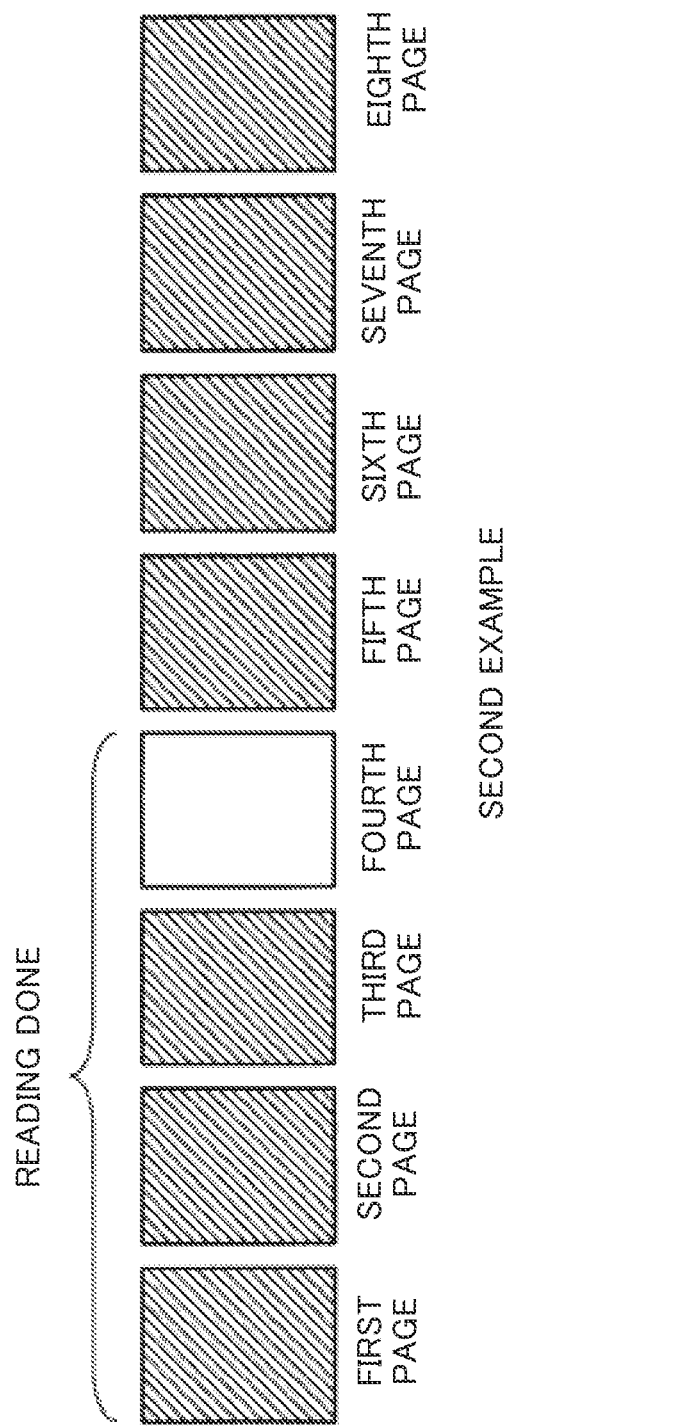
FIG. 7 is a schematic drawing showing a second example of the pages to be read.

Further, it will be assumed, as a second example, that the respective read faces of the documents D1 to D3 and D5 to D8 are the non-blank faces, and the read face of the document D4 is the blank face. In other words, as shown in FIG. 7, the first to third pages and the fifth to eighth pages are the non-blank pages, and the fourth page is the blank page.

In the case of the second example, the preview image PG of the fourth page (based on the image data of the document D4) is displayed. In other words, the preview image PG representing the blank page is displayed.

In the second example, the document D, the read face of which is the blank face, has not been discharged to the document discharge tray 102. Accordingly, when the preview image PG representing the blank page is displayed in the second example, the user is led to decide that the reading has been completed up to the document D4, and consequently the documents D5 to D8 are reset on the document setting tray 101.

To prevent the occurrence of the erroneous setting, the control device 3 selects the preview image PG to be displayed on the operation panel 5, on the basis of the number of blank pages read by the image reader 1, during the period from the start of the moving document reading job to the suspension thereof. In other words, the control device 3 determines which page should be displayed on the operation panel 5 as the preview image PG, on the basis of the number of blank pages read by the image reader 1, during the period from the start of the moving document reading job to the suspension thereof.

Figure 8:
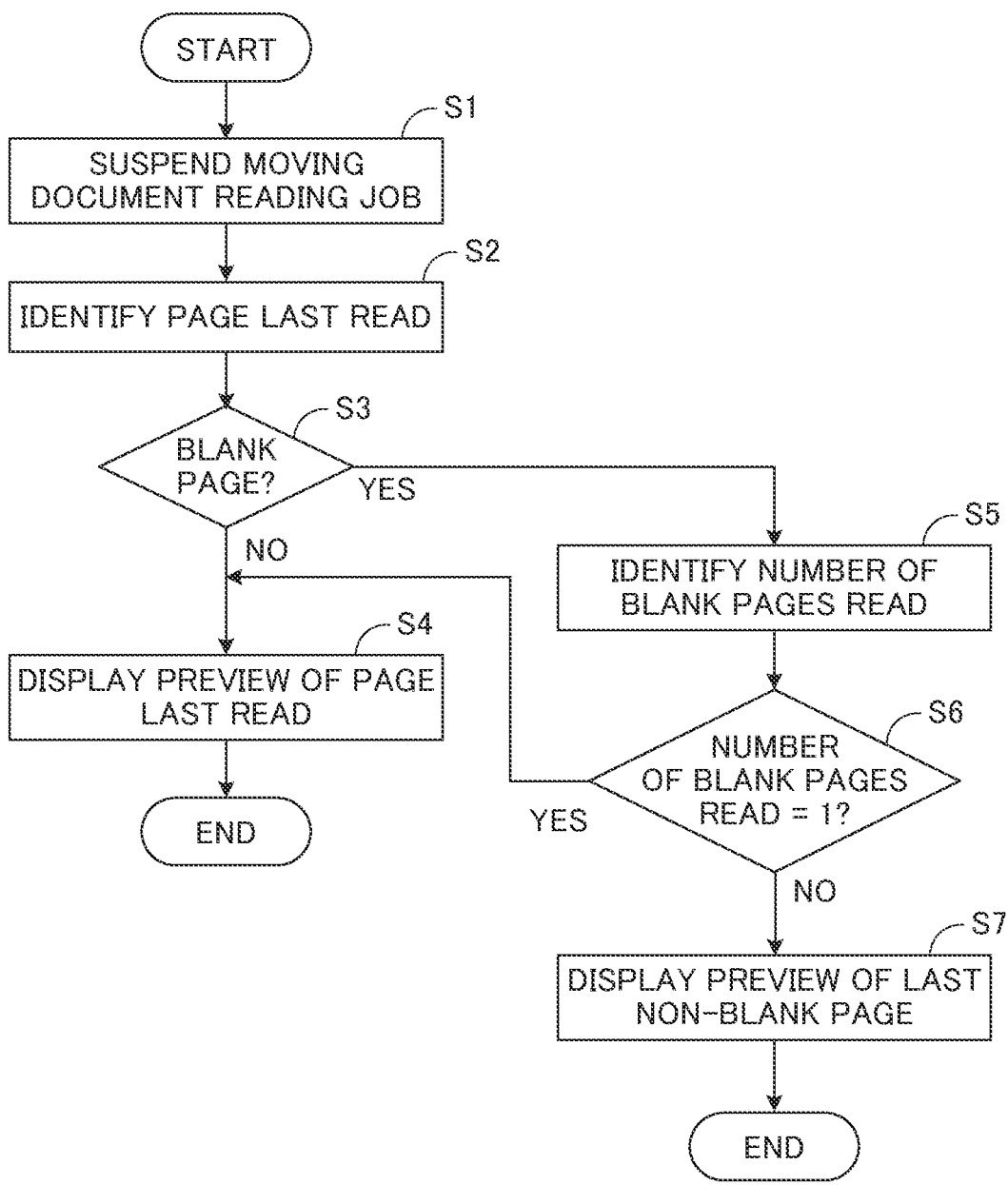
FIG. 8 is a flowchart showing an operation performed by a control device of the image forming apparatus according to the embodiment of the disclosure.

Hereunder, the mentioned process will be described in further detail, with reference to a flowchart shown in FIG. 8. The process according to the flowchart shown in FIG. 8 starts when the control device 3 detects that jam has occurred on the document transport route 10P, while executing the moving document reading job.

At step S1, the control device 3 suspends the moving document reading job. At this point, the document transport device 10 stops transporting the document D. Therefore, the documents D are detained on the document transport route 10P.

At step S2, control device 3 identifies the page that has been read last (hereinafter, page last read), during the period from the start of the moving document reading job to the suspension thereof. Then the control device 3 identifies to which page the page last read corresponds, when counted from the first page that was read in the moving document reading job. In other words, the control device 3 identifies up to which page the image reader 1 has completed the reading. In still other words, the control device 3 identifies after the reading of which page, the jam has occurred on the document transport route 10P.

At step S3, the control device 3 decides whether the page last read is the blank page. When the control device 3 decides that the page last read is not the blank page, the operation proceeds to step S4. In other words, when the control device 3 decides that the page last read is the non-blank page, the operation proceeds to step S4.

At step S4, the control device 3 generates the preview image PG of the page last read, on the basis of the image data thereof. Then the control device 3 displays the preview image PG of the page last read, on the operation panel 5. The operation panel 5 displays the error screen 50 including the preview image PG of the page last read.

It will be assumed that, for example, jam has occurred in the state illustrated in the upper section of FIG. 5. In the example illustrated in the upper section of FIG. 5, the jam occurred after the document D4 has been read, and before the next document D5 is completely read. Therefore, the page last read is the fourth page. When "No" is selected at step S3 in such an example, it means that the fourth page is not the blank page (the read face of the document D4 is not the blank face). In this case, the preview image PG of the fourth page, which is the non-blank page, is displayed.

When the control device 3 decides at step S3 that the page last read is the blank page (Yes at step S3), the operation proceeds to step S5.

At step S5, the control device 3 identifies the number of blank pages that have been read by the image reader 1, during the period from the start of the moving document reading job to the suspension thereof. Hereinafter, such number will be referred to as the number of blank pages read.

At step S6, the control device 3 decides whether the number of blank pages read is 1. When the control device 3 decides that the number of blank pages read is 1, the operation proceeds to step S4.

It will be assumed that, for example, jam has occurred in the state illustrated in the upper section of FIG. 5. In the example illustrated in the upper section of FIG. 5, the jam occurred after the document D4 has been read, and before the next document D5 is completely read. Therefore, the page last read is the fourth page. When the operation proceeds to step S6 in such an example, it means that the fourth page is the blank page (the read face of the document D4 is the blank face). Further, when "Yes" is selected at step S6, it means that the number of blank pages read is 1, and since the one blank page is the fourth page, the respective read faces of the documents D1 to D3 discharged to the document discharge tray 102 are the non-blank face. In this case, although the fourth page is the blank page, the preview image PG of the fourth page is displayed.

Here, the validity and invalidity of the blank page exclusion function can be optionally selected by the user. Accordingly, the moving document reading job may be executed, with the blank page exclusion function set valid. However, the control device 3 displays the preview image PG of the page last read, in other words the blank page, on the operation panel 5, provided that the page last read is the blank page, and the number of blank pages read is 1, despite the blank page exclusion function being set valid.

Hereunder, a variation of the operation, performed when step S6 is followed by step S4, will be described. In this variation, the control device 3 displays page information, indicating to which page the page last read corresponds, when counted from the first page that was read in the moving document reading job, on the operation panel 5. The operation panel 5 displays, for example, the error screen 50 including such page information. In this variation, it is not mandatory to display the preview image PG of the page last read (blank page). Alternatively, the preview image PG of the page last read (blank page) and the page information may both be displayed.

When the control device 3 decides at step S6 that the number of blank pages read is not 1, the operation proceeds to step S7. In other words, when the number of blank pages read is two or more, the operation proceeds to step S7. In still other words, when there are one or more other blank pages, in addition to the page last read, the operation proceeds to step S7.

At step S7, the control device 3 identifies the non-blank page that has been read last (hereinafter, last non-blank page), during the period from the start of the moving document reading job to the suspension thereof. The control device 3 also generates the preview image PG of the last non-blank page, on the basis of the image data thereof. Then the control device 3 displays the preview image PG of the last non-blank page, on the operation panel 5. The operation panel 5 displays the error screen 50 including the preview image PG of the last non-blank page.

It will be assumed that, for example, jam has occurred in the state illustrated in the upper section of FIG. 5. In the example illustrated in the upper section of FIG. 5, the jam occurred after the document D4 has been read, and before the next document D5 is completely read. Therefore, the page last read is the fourth page. When the operation proceeds to step S6 in such an example, it means that the fourth page is the blank page (the read face of the document D4 is the blank face). Further, when "No" is selected at step S6, it means that the number of blank pages read is two or more, one of which is the fourth page. Therefore, one of the respective read faces of the documents D1 to D3 discharged to the document discharge tray 102 is the blank face.

It will be assumed here that, for example, the read face of the document D3 is the non-blank face. In this case, the last non-blank page is the third page, and therefore the preview image PG of the third page (non-blank page) is displayed.

As another example, it will be assumed that the read face of the document D3, in addition to that of the document D4, is the blank face, and the read face of the document D2 is the non-blank face. In this case, the last non-blank page is the second page, and therefore the preview image PG of the second page (non-blank page) is displayed.

In any case, when the page last read is the blank page, and the number of blank pages read is two or more, the preview image PG of the last non-blank page is displayed, and the preview image PG of the blank page is not displayed.

In the case where jam occurs after the blank pages have been consecutively read a plurality of times, and before the reading of the next page is completed, the control device 3 identifies the number of blank pages consecutively read immediately before the occurrence of the jam, and displays information indicating the number of blank pages consecutively read, on the operation panel 5.

For example, when the read face of the document D3, in addition to that of the document D4, is the blank face, and the read face of the document D2 is the non-blank face, the number of blank pages consecutively read is two. Therefore, the information indicating that the number of blank pages consecutively read is two is displayed on the operation panel 5.

The image forming apparatus 100 according to this embodiment includes, as described above, the operation panel 5, the document transport device 10 that transports the document D while the moving document reading job is being performed, the image reader 1 that reads the document D being transported by the document transport device 10, and the control device 3 that decides, whether the page of the document D read by the image reader 1 is the blank page without an image, or the non-blank page including an image, with respect to each of the pages read. When jam occurs while the moving document reading job is being executed, the control device 3 suspends the moving document reading job. The control device 3 decides whether the page that has been read last, during the period from the start of the moving document reading job to the suspension thereof, is the blank page. The control device 3 also identifies the number of blank pages that have been read during the period from the start of the moving document reading job to the suspension thereof.

Further, when the page last read is the blank page, and the number of blank pages read is two or more, the control device 3 displays the preview image PG of the non-blank page that has been read last, during the period from the start of the moving document reading job to the suspension thereof, on the operation panel 5.

Now, in the first example shown in FIG. 6, jam has occurred after the fourth page has been completely read, and before the reading of the fifth page is completed.

In this case, the existing apparatuses display the preview image of the fourth page. Since the fourth page is the blank page, the preview image of the blank page is displayed. When the preview image of the blank page is displayed, the user may misunderstand that the preview image being displayed corresponds to the second page. This is because the second page is also the blank page. Such misunderstanding by the user may lead to erroneous setting, in which the document D that has been completely read is reset on the document setting tray.

According to this embodiment, in contrast, when the page last read is the blank page, and the number of blank pages read is two or more, the preview image PG of the non-blank page that has been read last, during the period from the start of the moving document reading job to the suspension thereof, is displayed. The page last read is the fourth page, and the fourth page is the blank page. In addition, the reading of the first to fourth pages has been completed during the period from the start of the moving document reading job to the suspension thereof, and the second and fourth pages are the blank pages, and therefore the number of blank pages read is two or more. Further, the non-blank page that has been read last, during the period from the start of the moving document reading job to the suspension thereof, is the third page.

Therefore, the preview image PG of the third page is displayed. Since the preview image PG being displayed is not blank, the user can easily identify to which page the preview image PG being displayed corresponds. In other words, the user can easily identify the document D that is unread yet. In this example, the user decides that the reading has been completed at least up to the third page. Accordingly, the user can be exempted from committing the erroneous setting, in which the document D that has been completely read is reset on the document setting tray 101. Further, in the case where the first one of the documents D subsequent to the document D that has been completely read is the blank page, when the user resets those subsequent documents D on the document setting tray 101 to resume the document reading, the user can decide not to reset the document D which is the blank page, on the document setting tray 101.

Further, when the page last read is the blank page, and the number of blank pages read is two or more, the control device 3 may also display, in addition to the preview image of the non-blank page that has been read last during the period from the start of the moving document reading job to the suspension thereof, the information indicating to which page that non-blank page corresponds, when counted from the first page that was read in the moving document reading job, on the operation panel 5. In this case, the user can recognize to which of the documents D the non-blank page that has been read last corresponds, and therefore the user can quickly and accurately extract the non-blank page that has been read last from the group of documents, when resuming the document reading, and be exempted from erroneously setting the document D that has already been read, on the document setting tray 101.

In this embodiment, when the page last read is the blank page, and the number of blank pages read is 1, the control device 3 displays the preview image PG of the page last read, on the operation panel 5. In this case, since the preview image PG of the page last read is displayed, the user can accurately recognize up to which page the reading has been completed. Here, the fact that the page last read is the blank page, and that the number of blank pages read is 1 indicates that the blank page that has been read during the period from the start of the moving document reading job to the suspension thereof is only the page last read. Therefore, the user can be prevented from misunderstanding that the document D that has already been read (document D discharged to the document discharge tray 102) is unread yet, despite the preview image PG of the page last read, in other words the preview image PG of the blank page, being displayed.

In this embodiment, when the page last read is the blank page, and the number of blank pages read is 1, the control device 3 displays the page information indicating to which page the page last read corresponds, when counted from the first page that was read in the moving document reading job, on the operation panel 5. When the preview image PG of the blank page is displayed, the user may be embarrassed. For example, the user may misunderstand that something has gone wrong with the image reader 1 (e.g., image sensor 12). However, displaying the page information in addition to the preview image PG of the blank page allows the user to recognize that the Nth page (N is the number according to the page information) from the first page is the blank page. In other words, the user can be made aware that the blank page was inserted. Therefore, the user can be prevented from being embarrassed, despite the preview image PG of the blank page being displayed.

In this embodiment, when jam occurs after the blank pages have been consecutively read a plurality of times, and before the reading of the next page is completed, the control device 3 identifies the number of blank pages consecutively read immediately before the occurrence of the jam, and displays information indicating the number of blank pages consecutively read, on the operation panel 5. Such an arrangement allows the user to recognize how many blank pages have been read, after the page corresponding to the preview image PG was read, thereby improving the user-friendliness of the apparatus.

In this embodiment, further, when the page last read is the non-blank page, the control device 3 displays the preview image PG of the page last read on the operation panel 5, irrespective of the number of blank pages read. When the page last read is the non-blank page, displaying the preview image PG of the page last read facilitates the unread document D to be identified.

The foregoing embodiments are merely exemplary in all aspects, and not be construed as limiting. The scope of the disclosure is not defined by the description of the embodiments, but by the appended claims, and encompasses all modifications that fall within the scope and spirit equivalent to those of the appended claims.

What is claimed is:

1. An image reading device comprising:
   an operation panel;
   a document transport device that transports a source document while a moving document reading job is being performed;
   an image reader that reads the source document being transported by the document transport device; and
   a control device including a processor, and configured to decide, when the processor executes a control program, whether a page of the source document read by the image reader is a blank page without an image, or a non-blank page including an image, with respect to each of the pages read,
   the control device being further configured to:
      suspend the moving document reading job, when jam occurs during the moving document reading job;
      decide whether a page last read during a period from start of the moving document reading job to the suspension thereof is the blank page;
      identify a number of blank pages read during the period from the start of the moving document reading job to the suspension thereof; and
      display, on the operation panel, a preview image of the non-blank page that has been read last in the period from the start of the moving document reading job to the suspension thereof, when the page last read is the blank page, and the number of blank pages read is two or more.

2. The image reading device according to claim 1, wherein, when the page last read is the blank page, and the number of blank pages read is two or more, the control device displays, on the operation panel, the preview image of the non-blank page that has been read last during the period from the start of the moving document reading job to the suspension thereof, and also information indicating to which page the non-blank page corresponds, when counted from a first page that was read in the moving document reading job.

3. The image reading device according to claim 1, wherein, when the page last read is the blank page, and the number of blank pages read is 1, the control device displays the preview image of the page last read, on the operation panel.

4. The image reading device according to claim 1, wherein, when the page last read is the blank page, and the number of blank pages read is 1, the control device displays, on the operation panel, information indicating to which page the page last read corresponds, when counted from a first page that was read in the moving document reading job.

5. The image reading device according to claim 1, wherein, when the jam occurs after the blank pages have been consecutively read a plurality of times, and before reading of a next page is completed, the control device identifies a number of blank pages consecutively read immediately before occurrence of the jam, and displays information indicating the number of blank pages consecutively read, on the operation panel.

6. The image reading device according to claim 1, wherein, when the page last read is the non-blank page, the control device displays the preview image of the page last read on the operation panel, irrespective of the number of blank pages read.

7. An image forming apparatus comprising:
the image reading device according to claim 1; and
an image forming device that forms an image on a recording medium.

* * * * *